US012749001B2

(12) United States Patent
Chong et al.

(10) Patent No.: US 12,749,001 B2
(45) Date of Patent: Sep. 29, 2026

(54) SYSTEM AND METHOD OF DECODING FOR QUANTUM ERROR CORRECTION IN QUANTUM COMPUTING

(71) Applicant: The University of Chicago, Chicago, IL (US)

(72) Inventors: Frederic T. Chong, Chicago, IL (US); Gokul Subramanian Ravi, Chicago, IL (US); Jonathan M. Baker, Chicago, IL (US)

(73) Assignee: The University of Chicago, Chicago, IL (US)

( * ) Notice: Subject to any disclaimer, the term of this patent is extended or adjusted under 35 U.S.C. 154(b) by 58 days.

(21) Appl. No.: 19/103,043

(22) PCT Filed: Aug. 16, 2023

(86) PCT No.: PCT/US2023/072294
§ 371 (c)(1),
(2) Date: Feb. 11, 2025

(87) PCT Pub. No.: WO2024/040107
PCT Pub. Date: Feb. 22, 2024

(65) Prior Publication Data

US 2026/0050817 A1 Feb. 19, 2026

Related U.S. Application Data

(60) Provisional application No. 63/398,620, filed on Aug. 17, 2022.

(51) Int. Cl.
*G06N 10/70* (2022.01)
*G06N 10/20* (2022.01)

(52) U.S. Cl.
CPC ............ *G06N 10/70* (2022.01); *G06N 10/20* (2022.01)

(58) Field of Classification Search
None
See application file for complete search history.

(56) References Cited

U.S. PATENT DOCUMENTS 10,872,021 B1 * 12/2020 Tezak .................. G06F 11/2236
11,900,221 B1 * 2/2024 Chamberland ........ G06N 10/20
(Continued)

OTHER PUBLICATIONS

International Search Report and Written Opinion for PCT Patent Application No. PCT/US2023/072294 mailed Nov. 17, 2023; 10 pp.

*Primary Examiner* — Mujtaba M Chaudry
(74) *Attorney, Agent, or Firm* — Armstrong Teasdale LLP

(57) ABSTRACT

A quantum computing system including a quantum computing resource having a plurality of logical qubits, a classical memory, an on-chip decoder controller, and at least one classical processor is disclosed. The on-chip decoder controller (i) measures, during a respective cycle, a plurality of parity ancilla qubits corresponding to a plurality of physical data qubits of a logical qubit; (ii) in accordance with the measured plurality of parity ancilla qubits, generates a plurality of error signatures corresponding to the plurality of physical data qubits; (iii) categorizes each error signature of the plurality of error signatures into a simple error signature or a complex error signature; (iv) applies error correction to at least one physical data qubit of the plurality of physical data qubits corresponding to each simple error signature; and (v) transfers each complex error signature for off-chip decoding by the at least one classical processor.

20 Claims, 8 Drawing Sheets

(56) References Cited

U.S. PATENT DOCUMENTS

| | | | | |
|---|---|---|---|---|
| 11,966,817 | B1 * | 4/2024 | Shutty | G06N 10/00 |
| 2014/0264283 | A1 * | 9/2014 | Gambetta | B82Y 10/00<br>257/31 |
| 2018/0330265 | A1 * | 11/2018 | Kelly | G06F 11/0751 |
| 2019/0386685 | A1 | 12/2019 | Haah et al. | |
| 2020/0274554 | A1 | 8/2020 | Aspuru-Guzik et al. | |
| 2021/0406749 | A1 | 12/2021 | Oliver et al. | |
| 2022/0405629 | A1 * | 12/2022 | Ella | G06N 10/70 |
| 2023/0071000 | A1 * | 3/2023 | Higgott | G06N 10/70 |

* cited by examiner

SYSTEM AND METHOD OF DECODING FOR QUANTUM ERROR CORRECTION IN QUANTUM COMPUTING

CROSS REFERENCE TO RELATED APPLICATION

This application is a U.S. National Phase Application of International Patent Application No. PCT/US2023/072294 filed Aug. 16, 2023, which claims priority to U.S. Provisional Application No. 63/398,620, filed Aug. 17, 2022, which are hereby incorporated by reference in their entireties.

STATEMENT REGARDING FEDERALLY SPONSORED RESEARCH & DEVELOPMENT

This invention was made with government support under grant numbers CCF-1730082/1730449, 2030859, Phy-1818914, 2110860, and OMA-2016136 awarded by the National Science Foundation and grant numbers DE-SC0020289 and DE-SC0020331 awarded by the Department of Energy. The government has certain rights in the invention.

TECHNICAL FIELD

This disclosure relates generally to quantum computing and, in particular, to systems and methods of decoding for quantum error correction in quantum computing.

BACKGROUND

Recent developments in quantum computing have pushed quantum computers closer to solving classically intractable problems. Existing quantum programming languages and compilers use a quantum assembly language composed of 1- and 2-quantum bit ("qubit") gates to prepare and execute primitive operations on quantum computers. Recent advancements in hardware and software include devices such as IBM's 50-qubit quantum machine and Google's 72-qubit machine, as well as classical-quantum hybrid algorithms tailored for such Noisy Intermediate-Scale Quantum ("NISQ") machines, such as Quantum Approximate Optimization Algorithm ("QAOA") and Variational Quantum Eigensolver ("VQE").

However, today's NISQ machines include imperfect qubits causing high error rates in the form of state preparation and measurement (SPAM) errors, gate errors, qubit decoherence, crosstalk, and so on. These errors occur due to multiple noise sources, for example, imperfect classical control of quantum devices, thermal fluctuations, destructive qubit coupling, connectivity related issues, imperfect insulation of the qubits, quasi-particles, and/or other external stimuli. Currently known fabrication techniques lack the precision to make homogeneous batches of quantum devices, and, therefore, noise properties are distinct for each quantum devices. In addition, due to dynamic nature of quantum devices, noise sources are not consistent or static, but instead the noise sources go through spatial and/or temporal variation. Accordingly, a quantum application's execution is impacted by noise sources having dynamic characteristics, which further impacts each quantum application's fidelity to be impacted in a unique way.

Various error mitigation techniques have been explored and are being used to reduce the effects of noise on circuit execution on the quantum machine. These error mitigation techniques include, for example, noise-aware compilation, scheduling to reduce crosstalk, 1Q gate scheduling in idle windows, dynamic decoupling, zero-noise extrapolation, readout error mitigation, exploiting quantum reversibility, and so on. However, even with the currently known error mitigation techniques, execution fidelity is still extremely small for most quantum circuits of more than 10 qubits. In the NISQ era, quantum hardware with hundreds or thousands of qubits is anticipated. And, using the currently available classical computing system assisted by supercomputers, quantum systems of about 50 qubits can be simulated.

Currently available NISQ machines allow quantum applications such as variational quantum algorithms, but large-scale algorithms such as Shor's factoring and/or Grover search which demand high accuracy and low qubit error rates are generally not support. Accordingly, in addition to innovate across hardware and software stack to improve accuracy and to lower qubit error rates, a faut-tolerant system using quantum error correction (QEC) may be desired.

BRIEF DESCRIPTION

In one aspect, a quantum computing system providing quantum processing as a service is disclosed. The quantum computing system generally comprises a quantum computing resource including a plurality of logical qubits, a classical memory storing a quantum circuit of a quantum application and instructions for execution of the quantum circuit, at least classical processor, and an on-chip decoder controller that is communicatively coupled with the quantum computing resource and including at least one classical processor. Each logical qubit includes a plurality of physical data qubits and a plurality of parity ancilla qubits. The at least classical processor of the on-chip decoder controller is configured to: (i) measure the plurality of parity ancilla qubits corresponding to the plurality of physical data qubits during a respective cycle; (ii) in accordance with the measured plurality of parity ancilla qubits, generate a plurality of error signatures corresponding to the plurality physical data qubits during the respective cycle; (iii) categorize each error signature of the plurality of error signatures as one of a simple error signature and a complex error signature; (iv) apply error correction to at least one physical data qubit of the plurality of physical data qubits corresponding to each error signature categorized as the simple error signature; and (v) transfer each error signature categorized as the complex error signature for off-chip decoding during the respective cycle. The at least one classical processor executing the stored instructions for execution of the quantum circuit (i) receives, from the on-chip decoder controller, error data associated with one or more complex error signatures of the plurality of error signatures; and (ii) in accordance with the received error data, decodes the one or more complex error signatures of the plurality of error signatures for error correction.

In another aspect, a method of decoding for quantum error correction during execution of a quantum application circuit on a quantum computing resource is disclosed. The quantum computing resource generally comprises a plurality of logical qubits. Each logical qubit of the plurality of qubits includes a plurality of physical data qubits and a plurality of parity ancilla qubits. The method is implemented using at least one classical processor of a classical computing resource in communication with a classical memory of the classical computing resource. The method includes, during a respective cycle of the execution of the quantum application circuit, causing at least one classical processor included in a decoder controller communicatively coupled with the quantum computing resource to: (i) measure the plurality of parity ancilla qubits corresponding to the plurality of physical data qubits; (ii) in accordance with the measured plurality of parity ancilla qubits, generate a plurality of error signatures corresponding to the plurality physical data qubits; (iii) categorize each error signature of the plurality of error signatures as one of a simple error signature and a complex error signature; (iv) apply error correction to at least one physical data qubit of the plurality of physical data qubits corresponding to each error signature categorized as the simple error signature; and (v) transfer each error signature categorized as the complex error signature for decoding by the at least one classical processor of the classical computing resource. The method includes receiving, from the decoder controller, error data associated with one or more complex error signatures of the plurality of error signatures, and in accordance with the received error data, decoding the one or more complex error signatures of the plurality of error signatures for error correction.

In yet another aspect, a quantum computing system including a quantum computing resource, a primary decoder controller, and a secondary decoder controller is disclosed. The primary decoder controller generally comprises at least one classical processor communicatively coupled with the quantum computing resource, which includes a plurality of logical qubits. Each logical qubit of the plurality of logical qubits includes a plurality of physical data qubits and a plurality of parity ancilla qubits. The at least one classical processor of the primary decoder controller is configured to: (i) measure the plurality of parity ancilla qubits corresponding to the plurality of physical data qubits during a respective execution cycle; (ii) in accordance with the measured plurality of parity ancilla qubits, generate a plurality of error signatures corresponding to the plurality physical data qubits during the respective execution cycle; (iii) categorize each error signature of the plurality of error signatures as one of a simple error signature and a complex error signature; (iv) apply error correction to at least one physical data qubit of the plurality of physical data qubits corresponding to each error signature categorized as the simple error signature; and (v) transfer each error signature categorized as the complex error signature for decoding by a secondary decoder controller during the respective cycle. The secondary decoder controller includes at least one classical processor configured to; (i) receive, from the primary decoder controller, error data associated with one or more complex error signatures of the plurality of error signatures; and (ii) in accordance with the received error data, decode the one or more complex error signatures of the plurality of error signatures for error correction.

BRIEF DESCRIPTION OF THE DRAWINGS

FIG. 1 illustrates exemplary benefits of better than worst case (BTWC) decoding for quantum error correction in a graph according to an exemplary embodiment as described in the present disclosure.

FIG. 2 illustrates a surface code according to an exemplary embodiment as described in the present disclosure.

FIG. 3 illustrates an exemplary comparison graph of syndrome distribution in percentage for various physical error rates and logical error rates corresponding to a respective code distance.

FIG. 4 illustrates functioning of an on-chip clique decoder according to an exemplary embodiment of the present disclosure.

FIG. 5 illustrates a physical mapping of a logical qubit 500 of a code distance d=7 according to an exemplary embodiment of the present disclosure.

FIG. 6 illustrates an exemplary circuit for determining whether an error signature corresponds with a trivial error or a complex error according to an exemplary embodiment of the present disclosure.

FIG. 7 illustrates a diagram of an exemplary quantum computing system for executing variational quantum programs on a quantum computing device.

FIG. 8 illustrates an exemplary flow-chart of method operations to decode error signatures according to an exemplary embodiment of the present disclosure.

DETAILED DESCRIPTION OF THE DISCLOSURE

Figure 1:
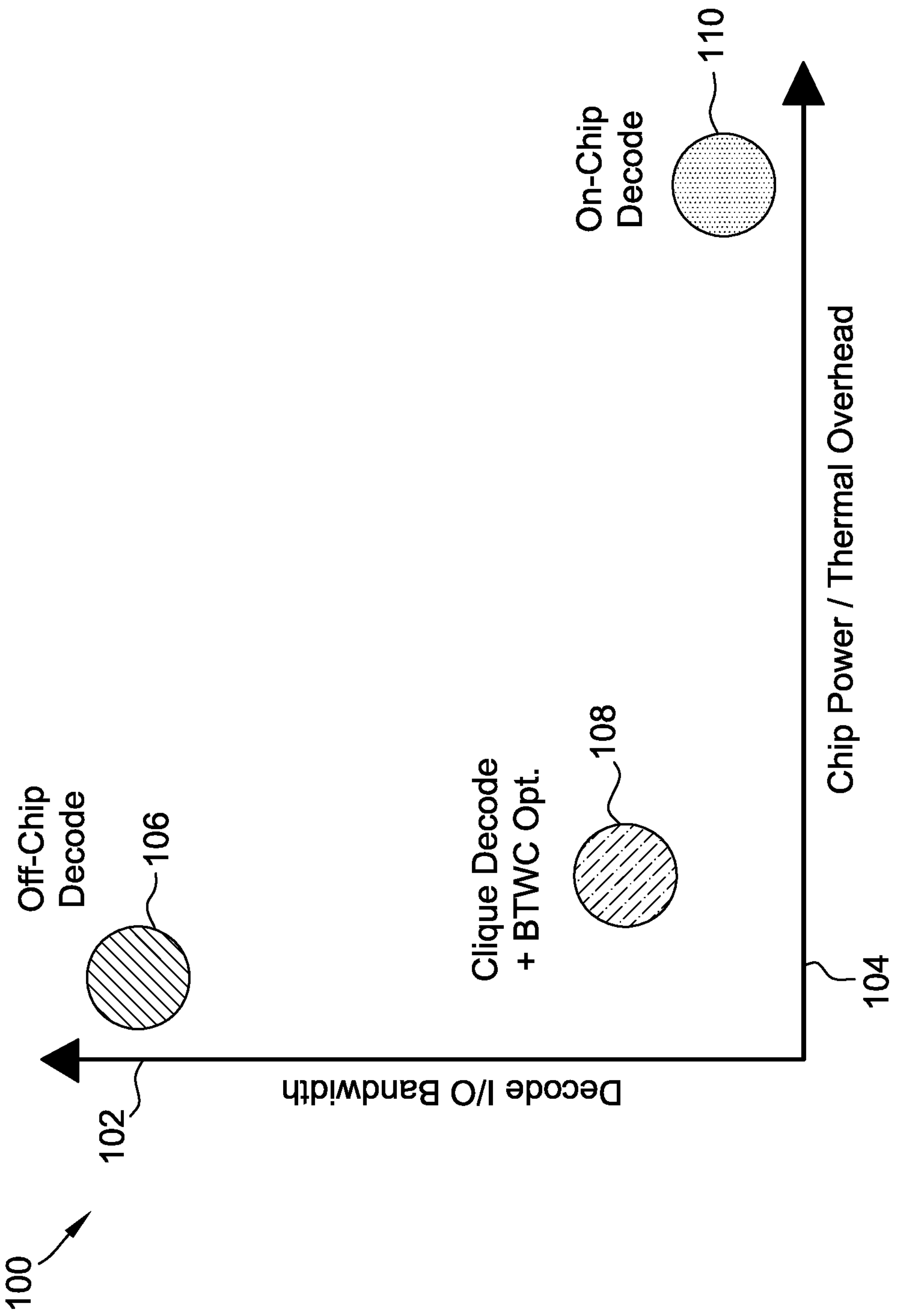
FIGS. 1-8 show exemplary embodiments of the methods and systems described herein, in accordance with some embodiments.

The following detailed description illustrates embodiments of the disclosure by way of example and not by way of limitation. It is contemplated that the disclosure has general application to quantum computing.

Currently available quantum computing devices are up to 100 qubits and are error-prone (e.g., state preparation and measurement (SPAM) errors, gate errors, qubit decoherence, crosstalk, and so on) due to multiple noise sources, for example, imperfect classical control of quantum devices, thermal fluctuations, destructive qubit coupling, connectivity related issues, imperfect insulation of the qubits, quasiparticles, and/or other external stimuli. Various error mitigation strategies may include, but are not limited to, noise-aware compilation, scheduling for crosstalk, 1Q gate scheduling in idle windows, dynamical decoupling, zero-noise extrapolation, readout error mitigation, exploiting quantum reversibility, and so on. Error mitigation techniques may also include quantum error correction decoding using a graph pairing algorithm, for example, a minimum weight perfect matching (MWPM) algorithm.

Embodiments of the present disclosure are directed to decoding for quantum error correction using on-chip decoders, which may be implemented using an array of logic gates, in cryogenic domain, to perform online decoding for trivial error signatures (also referenced in the present disclosure as simple error signatures), and off-chip decoder for decoding complex error signatures. The on-chip decoder referenced in the present disclosure may be a tier-1 decoder in cryogenic domain, and the off-chip decoder referenced in the present disclosure may be a tier-2 decoder operating at room temperature. Further, the on-chip decoder referenced in the present disclosure may not be on a quantum computing chip. Even though, an on-chip decoder (or a tier-1 decoder) and an off-chip decoder (or a tier-1 decoder and a tier-2 decoder) are described, there may be up to tier-N decoder, where N may be greater than or equal to 2. Any number of tier-1 decoders may be operating within the cryogenic domain and/or at room temperature, where i is less than of equal to N.

In the present disclosure, a simple error, a common error, and/or a trivial error may be used interchangeably. Decoding and detection of quantum error correction may be performed using a plurality of surface codes. Overheads of classical decoding for quantum error correction generally grow rapidly with the number of logical qubits and their correction code distance. Decoding at room temperature may be bottlenecked due to refrigerator input-output (I/O) bandwidth, while on-chip decoding at cryogenic may be limited due to available area, power, and/or thermal budget.

However, because the most error correction syndromes or error correction cases are trivial with high redundancy or sparsity because the error correction codes may be overprovisioned to be able to correct for an uncommon worst-case scenario. By overprovisioning the error correction codes, substantially low logical error rates may be ensured, and the most of trivial error corrections may be handled with insignificant overhead and alleviating any bottlenecks towards handling a worst-case scenario by using, as referenced herein, better than worst-case (BTWC) decoding for quantum error correction. The BTWC decoding design, as described herein, may achieve high performance and/or low resource cost in the common or average case, and may fall back onto the robust worst-case design for the uncommon or worst case.

The BTWC decoding for quantum error correction, as described in the present disclosure, may include an on-chip clique decoder, a statistical off-chip bandwidth allocation method, and/or a method for stalling circuit execution in a worst-case scenario in which provisioned off-chip bandwidth is not sufficient to complete off-chip decoding. The on-chip clique decoder may be a lightweight decoder for correcting trivial common-case errors. The on-chip clique decoder may be designed to operate and function in cryogenic domain. By way of a non-limiting example, the on-chip clique decoder may be configured for single flux quantum (SFQ) logic, which is a classical logic implemented in superconducting hardware, and described in detail in the present disclosure. The statistical off-chip bandwidth allocation method allocates bandwidth for off-chip decoding for efficient handling of rare and/or complex decodes that may not be performed by on-chip clique decoder.

In some embodiments, and by way of a non-limiting example, the BTWC decoding for quantum error correction eliminates or reduces off-chip bandwidth allocation by about 70% to 99% across a range of logical and physical error rates. Logical error rate and physical error rate correspond with error rate with respect to a logical qubit and a physical qubit, respectively, and one logical qubit thus represents a group of (one or more) physical qubits. The BTWC decoding for quantum error correction, as described herein, may achieve 10-1000 times bandwidth reduction over currently known bandwidth reduction techniques and/or 15-37 times resource overhead reduction in comparison to currently known on-chip decoding.

FIG. 1 illustrates benefits of BTWC decoding for quantum error correction in a graph 100 according to an exemplary embodiment of the present disclosure. As shown in the graph 100, off-chip decoding 106 requires a much higher bandwidth that is represented in the graph along a Y-axis 102, whereas on-chip decoding 110 suffers from high thermal, power (e.g., chip power), and/or area (e.g., chip area) overheads in which chip power, and/or thermal overhead is represented by an X-axis 104. The BTWC decoding scheme using on-chip clique decoder for most trivial error cases, which is shown in FIG. 1 as 108, may mitigate bottlenecks associated with bandwidth, thermal, chip power, and/or chip area.

In some embodiments, the crux of quantum error correction depends on qubit redundancy and classical (computing) support via error detection, decoding, and/or correction. The qubit redundancy, as referenced herein, may require that a large number of physical qubits may be mapped to a single logical qubit, which may result in occurrence of physical errors that are fairly sparse in space and/or time. By way of an example, when the errors (e.g., physical errors) are sparse, corresponding error signatures may be trivial and may be deciphered by a classical decoder and appropriate corrections may be added to one or more erring qubits without requiring full decoding capabilities of the classical decoder. However, in some examples, physical errors may congregate, and the corresponding error signatures may become difficult and/or impossible to decode for a given error specification, and may, therefore, require the full decoding capabilities of the classical decoder. While such difficult and/or impossible to decode error scenarios may be rare, but an incorrect error signature handling may result in logical errors condemning the quantum computation. In some examples, costly worst-case ramifications of failed quantum computation may be avoided by setting qubit redundancy to be as high as possible. Additionally, or alternatively, the decoders (e.g., classical decoders) may be required to be designed for the highest accuracy possible at an expense of high resource cost to decipher the most complicated error signature. However, designing for the worst-case, and/or possibly rare error scenarios, may result in underutilization of quantum error correction resources.

In some embodiments, underutilization of quantum error correction resources may be avoided, as described herein, using BTWC decoding for quantum error correction in which handling of the common and/or trivial error signatures is decoupled from handling of the rare and/or complex error signatures. More common and/or trivial errors are identified and handled using a low-overhead on-chip clique decoder that is tailored to surface codes to identify and handle such trivial errors. By way of a non-limiting example, surface codes are quantum error correction codes having high error thresholds and high locality, and, therefore, amenable to trivial-case lightweight decoding. While trivial errors are handled by on-chip clique decoder, rare and/or complex error signatures are gracefully delegated to an off-chip decoder for more accurate decoding. Additionally, or alternatively, while delegating the rare and/or complex error signatures are being delegated to the off-chip decoder, bandwidth used may be controlled or minimized in accordance with other constraints. Accordingly, the on-chip clique decoder and the off-chip decoder, as described herein, may mitigate one or more bottlenecks associated with I/O bandwidth, chip power, chip area, and/or temperature.

In some embodiments, quantum error correction may use redundancy along with classical processing capability to improve error rates of qubits, which may further result in improving execution fidelity of a quantum application. By way of a non-limiting example, redundancy may be provided by encoding a logical qubit into a block of physical data qubits. Additionally, or alternatively, ancilla qubits may be appropriately tangled with each block of physical data qubits in order to receive error information corresponding to the physical data qubits. The ancilla qubits may be repeatedly (e.g., periodically and/or aperiodically) measured to produce classical error signature bits. In the present disclosure, the classical error signatures bits are referenced as syndromes. Measuring the ancilla qubits may not destroy a quantum state of the corresponding physical data qubits, but in fact may discretize the physical data qubit errors into a set of Pauli errors corresponding to a bit-flip error (X), a phase-flip error (Z), both bit and phase flip errors (Y), and/or no change (I).

A decoder may be used to decipher the error signature and identify the location and/or types of errors occurring on the data qubits. Based on the deciphered error signature, the identified location and/or the types of errors, appropriate corrections to the physical data qubits may be added for execution of a large-scale quantum application without an error. In some embodiments, and by way of a non-limiting example, physical qubit error rates are measured and compared with a predetermined threshold error rate. Upon determining that the physical qubit error rate is not above the predetermined threshold error rate, a size of a block of physical data qubits associated with or corresponding to a logical qubit may be increased. As described herein, increasing the size of the block of physical data qubits associated with or corresponding to the logical qubit may decrease logical error rate.

Figure 2:
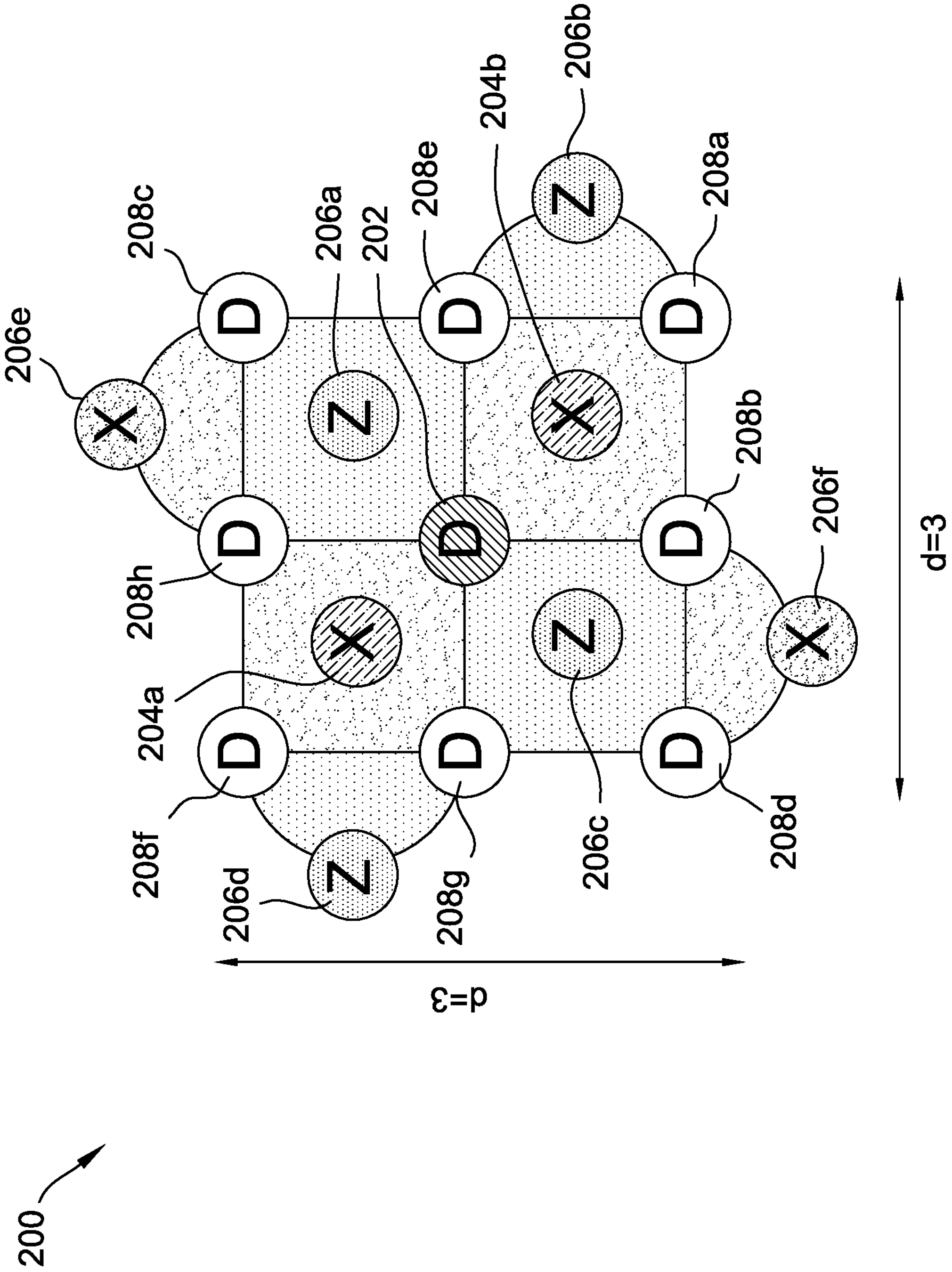

As stated above, correction codes are added to physical data qubits for error free execution of a large-scale quantum application. The correction codes added to the physical data qubits may be surface codes. The surface codes may encode each logical qubit into a two-dimensional (2D) lattice of alternating physical data qubits and parity (or ancilla) qubits. FIG. 2 illustrates a surface code 200 according to an exemplary embodiment as described in the present disclosure. The surface code 200 may be a distance 3 rotated surface code detecting a Z error (or a phase-flip error) on a physical data qubit 202 by flipping neighboring ancilla qubits 204*a* and 204*b*. Other physical data qubits in FIG. 2 are shown as 208*a*-208*h*, and parity (or ancilla qubits) are shown as 206*a*-206*f*. Since each logical qubit corresponding with a block of physical data qubits, increasing a code distance may quadratically increase the number of physical data qubits and parity qubits for each logical qubit. The code distance of the surface code 200 is 3. The code distance d may correspond with a sequence of d errors, or the shortest physical error chain, which cannot be corrected using surface codes. If a physical error rate per qubit is p, then the probability of chain of k errors may be proportional to $p^k$, which may be $p^{(1-k)}$ times less likely than a single error.

In some embodiments, and by way of a non-limiting example, a Z error (or a phase-flip error) on the physical data qubit 202 may be detected by the diagonally adjacent parity qubits 204*a* and 204*b*. Similarly, a X error (or a bit-flip error) may be detected on the Z parity bits 206*a* and 206*c*, and a Y error may be detected on the parity bits 204*a*, 204*b*, 206*a*, and 206*c*. These errors (e.g., a Z error, a X error, and/or a Y error) may be detected, for example, using one or more stabilizer circuits that entangle the parity qubits with the physical data qubits. The one or more stabilizer circuits may include a CNOT gate, an H gate, a S gate, and/or a 1-qubit measurement gate.

The surface code may be connected to nearest physical data qubits. However, some physical data qubits (e.g., physical data qubits in a corner) and/or some parity qubits (e.g., parity bits that are on an edge) may have fewer connections compared to other physical data qubits that are not in a corner and/or parity bits that are on an edge and may be processed differently. Additionally, or alternatively, in some embodiments, a surface code may be a rotated surface code, which may reduce a total physical qubit and gate overheads. Because of a compact representation, the rotated surface code may be a preferred surface code. While parity qubits may generate a correct error signature, in some examples, the generated error signature may be incorrect if other errors, for example, temporarily fickle measurement flip errors may also occur. By performing multiple rounds of measurements on ancilla qubits, additional redundancy over time may be achieved, which may provide accurate error detection in cases when there are temporarily fickle measurement flip errors.

While error detection and/or error correction may be performed in real-time and/or delayed, it is recommended that the error detection and/or error correction be performed in real-time for several reasons. While errors may be commuted through many gates (or in other words, error corrections may be applied after the fact), errors may not commute through certain types of gates (e.g., T gates) without some conditional corrections to S gates. In some examples, these conditional corrections to the S gates may be dependent on a history of syndromes (that are the classical error signatures) before the T gates. Even for a circuit in which T gates are absent, logging of syndromes and changes to the syndromes is an arduous task requiring substantial memory overhead for a larger (quantum application) circuit. Thus, while quantum computations may be technically stalled prior to T gate execution, a substantially high bandwidth (that is sufficiently greater than the average rate of syndrome generation) may be required to address decoding backlog that may accumulate at each cycle. Accordingly, error detection and/or error decoding is recommended to be performed in real time, and error corrections are recommended to be applied at every cycle, or at least on every cycle that involves at least one T gate.

In other words, the error detection and/or error decoding has tight latency constraints. Further, the syndrome data to be processed every cycle for each qubit may grow cubically with the code distance d (e.g., $d^2$ with qubits, and an additional d with measurement rounds), which may pose a serious issue of scalability. A decoder complexity to correctly decipher the syndromes may have a higher resource cost. Transmission of the syndrome data for off-chip decoding (e.g., decoding at room temperature) that requires a substantial bandwidth may be hindered due to limited I/O wiring as over-clustering I/O wires may lead to thermal and/or leakage issues that may further worsen error rates. And on-chip decoding at cryogenic temperature while alleviating bandwidth issue may suffer from constraints in terms of area, power, and/or thermal as the cryogenic controllers are located inside the dilution refrigerator(s).

Figure 3:
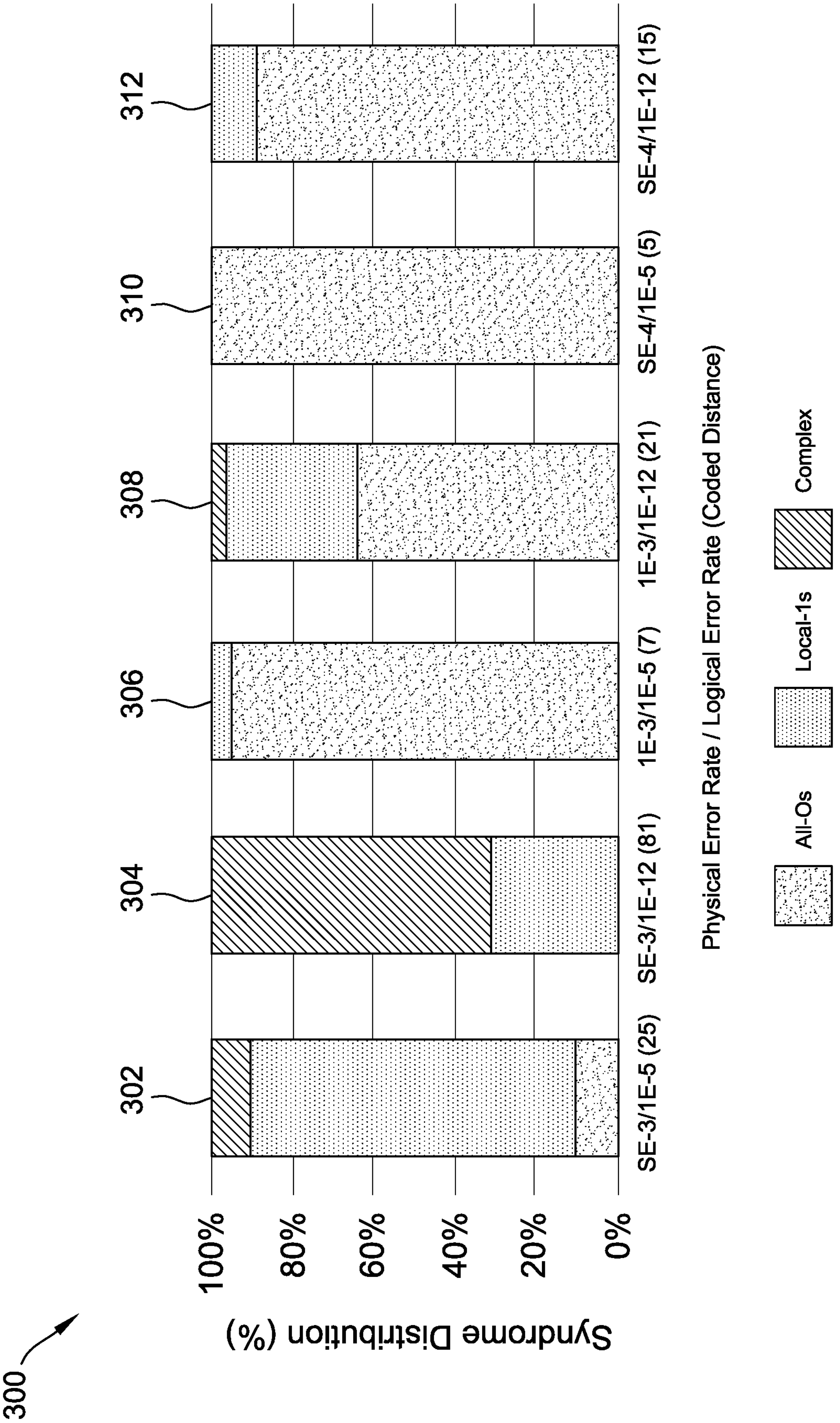

FIG. 3 illustrates an exemplary comparison graph 300 of syndrome distribution in percentage for various physical error rates and logical error rates corresponding to a respective code distance. As shown in the comparison graph 300, a syndrome distribution 302 may be obtained, for example, for actual physical data qubit error rate of 5e-3 and target logical error rate of 1e-5 for code distance 25. Similarly, a syndrome distribution 304 may be achieved, for example, for actual physical data qubit error rate of 5e-3 and target logical error rate of 1e-12 for code distance 81. Syndrome distributions 306 and 308 may be achieved, for example, for actual physical data qubit error rate of 1e-3 and target logical error rate of 1e-5 for code distance 7, and for actual physical data qubit error rate of 1e-3 and target logical error rate of 1e-12 for code distance 21. Syndrome distributions 310 and 312 may be achieved, for example, for actual physical data qubit error rate of 5e-4 and target logical error rate of 1e-5 for code distance 5, and for actual physical data qubit error rate of 5e-4 and target logical error rate of 1e-12 for code distance 15.

In FIG. 3, syndrome distribution for two different logical error rates 1e-5 and 1e-12, and three different physical data qubit error rates 5e-3, 1e-3, and 5e-4 is shown. The logical error rate of 1e-5 may be more suited for applications like variational algorithms (for molecular chemistry), and the logical error rate of 1e-12 may be more suited for algorithms for search and factorization. The physical data qubit error rate of 5e-3 may be just below the predetermined threshold error rate for surface codes, while the physical data qubit error rates of 1e-3 and 5e-4 may correspond with significant improvement to physical data qubit error rates. From the syndrome distributions shown in FIG. 3, it may be concluded that the physical data qubit error rate increases with an increase in the code distance, and vice versa.

The Syndrome distribution corresponding to each combination of physical data qubit error rate, logical error rate, and code distance includes error signatures corresponding at least one of: (i) no error; (ii) error signatures corresponding to localized errors without error chains; and (iii) error signatures corresponding to chains of errors. Generally, when physical data qubit errors rates are low, and/or when code distances in low, the error signatures may include all zeroes (identifying no error has occurred in those cycles). Further, errors are less likely to occur when there are lesser number of physical data qubits in a block. Error signatures corresponding to localized errors without error chains may be decoded fairly trivial. Error signatures corresponding to chains of errors may be complicated to decode and may require full capabilities or resources of complex decoders. Syndrome distributions in FIG. 3 illustrates that an increase in code distance and/or an impractical physical-logical error ratio conversion may be a cause for error signatures corresponding to chains of errors. In other words, as shown in FIG. 3, a high fraction of the syndromes (e.g., more than 90%) have error signatures that are trivial to decode, and, therefore, do not require full capabilities of a decoder. Thus, large number of error signatures may be decoded using on-chip clique decoder.

Figure 4:
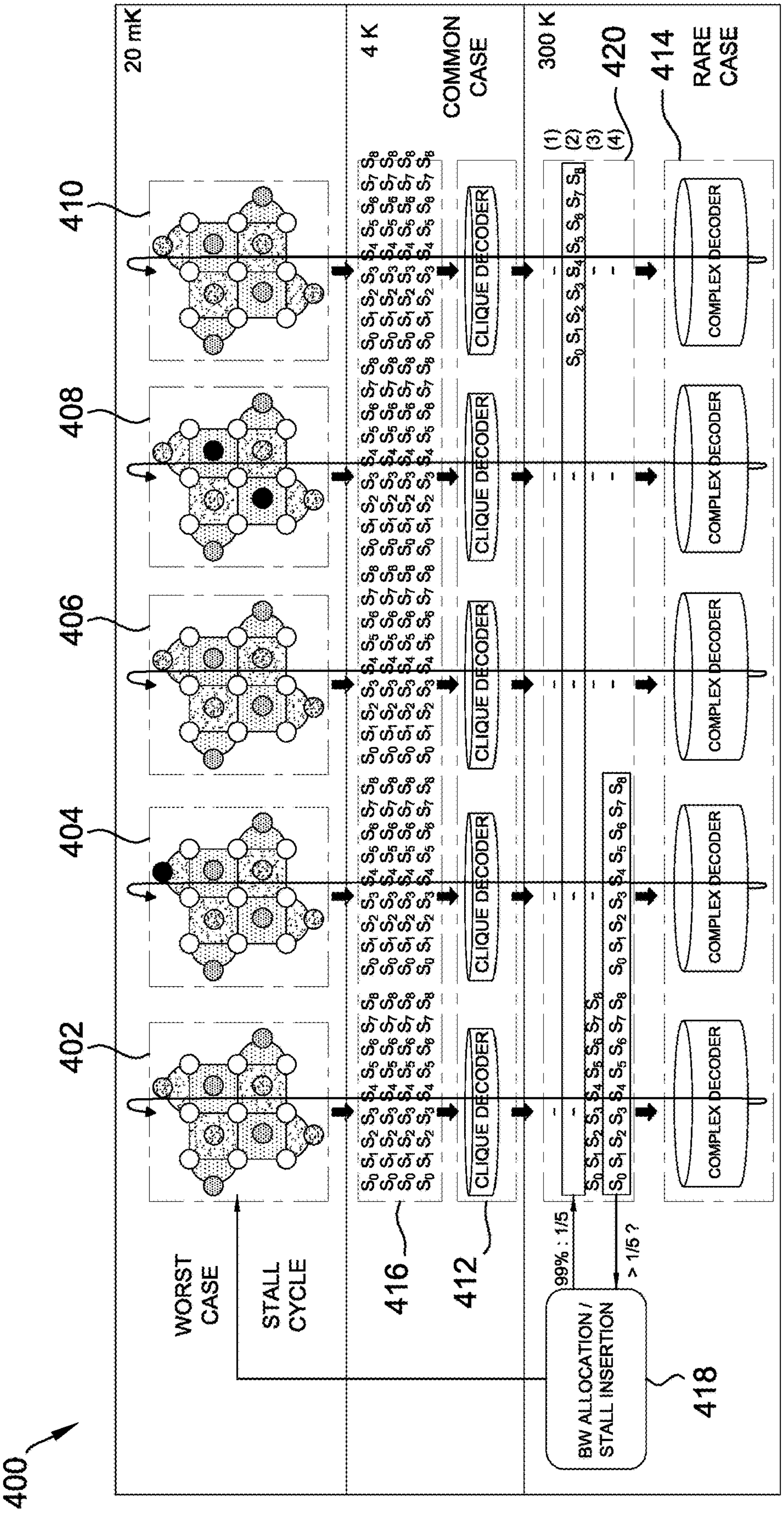

FIG. 4 illustrates functioning of an on-chip clique decoder according to an exemplary embodiment of the present disclosure. As shown in the diagram 400, each logical qubit of a plurality of logical qubits 402, 404, 406, 408, and 410 may include a plurality of physical data qubits and a plurality of ancilla qubits. Each logical qubit may be similar to a logical qubit shown in FIG. 2. At each cycle, each logical qubit may generate an error signature. Error signatures 416 may include a respective error signature generated by each logical qubit of logical qubits 402, 404, 406, 408, and 410 at every cycle. The error signatures 416 may be decoded and followed by appropriate correction. As shown in FIG. 4, the error signatures are decoded or evaluated by on-chip clique decoder 412 to identify and decode error signatures which are trivial to decipher. As described herein, about 99% of error signatures are trivial to decipher and would be decoded by the on-chip clique decoder 412. However, more complex error signatures 420 may be passed to an off-chip decoder 414 for decoding and applying appropriate correction. In order for the more complex error signatures 420 to be decoded by the off-chip decoder 414, required bandwidth is calculated and allocated by a bandwidth allocation and/or stall insertion module 418. The bandwidth allocation and/or stall insertion module 418 may be implemented by a classical computing device and may ensure that sufficient bandwidth is allocated for performing off-chip decoding of error signatures. Upon determining that the bandwidth required to be allocated for off-chip decoding exceeds the threshold bandwidth due to a count of complex error signatures to be decoded by off-chip decoder, the bandwidth allocation and/or stall insertion module 418 may stall or halt execution of the quantum application circuit. In some examples, execution of the quantum application circuit may be stalled or halted using pulse scheduling. In some examples, the threshold bandwidth may be determined and provisioned so that the error signatures to be decoded by off-chip decoder 414 may be decoded within a minimum number of stall cycles.

The on-chip clique decoder 412 may be configured to identify all-0 signatures and decode all-0 signatures. As described herein, an error signature including all-0 signifies no error has occurred, and, therefore, no error correction may be needed. The on-chip clique decoder 412 may be configured to identify and decode local-1s signatures, and apply appropriate corrections, for example, by manipulating a nearest physical data qubit of one or more parity qubits associated with the error signature. The on-chip clique decoder 412 may be configured to identify complex error signatures and notify the classical computing device controlling execution of the quantum application circuit to allow the identified complex signature to the off-chip decoder 414. Additionally. or alternatively, the on-chip clique decoder may aggregate or combine syndrome data from adjacent rounds of measurement for neutralizing a high percentage of measurement errors. By way of a non-limiting example, a total number of adjacent rounds of measurement may be predetermined or preconfigured, in part, based upon the resources available for the limited chip area, chip power, and/or thermal budget at cryogenic domain. Functioning of the on-chip clique decoder 412 in regards to detecting and decoding of an error signature may be described in detail below using a logical qubit shown in FIG. 5.

Figure 5:
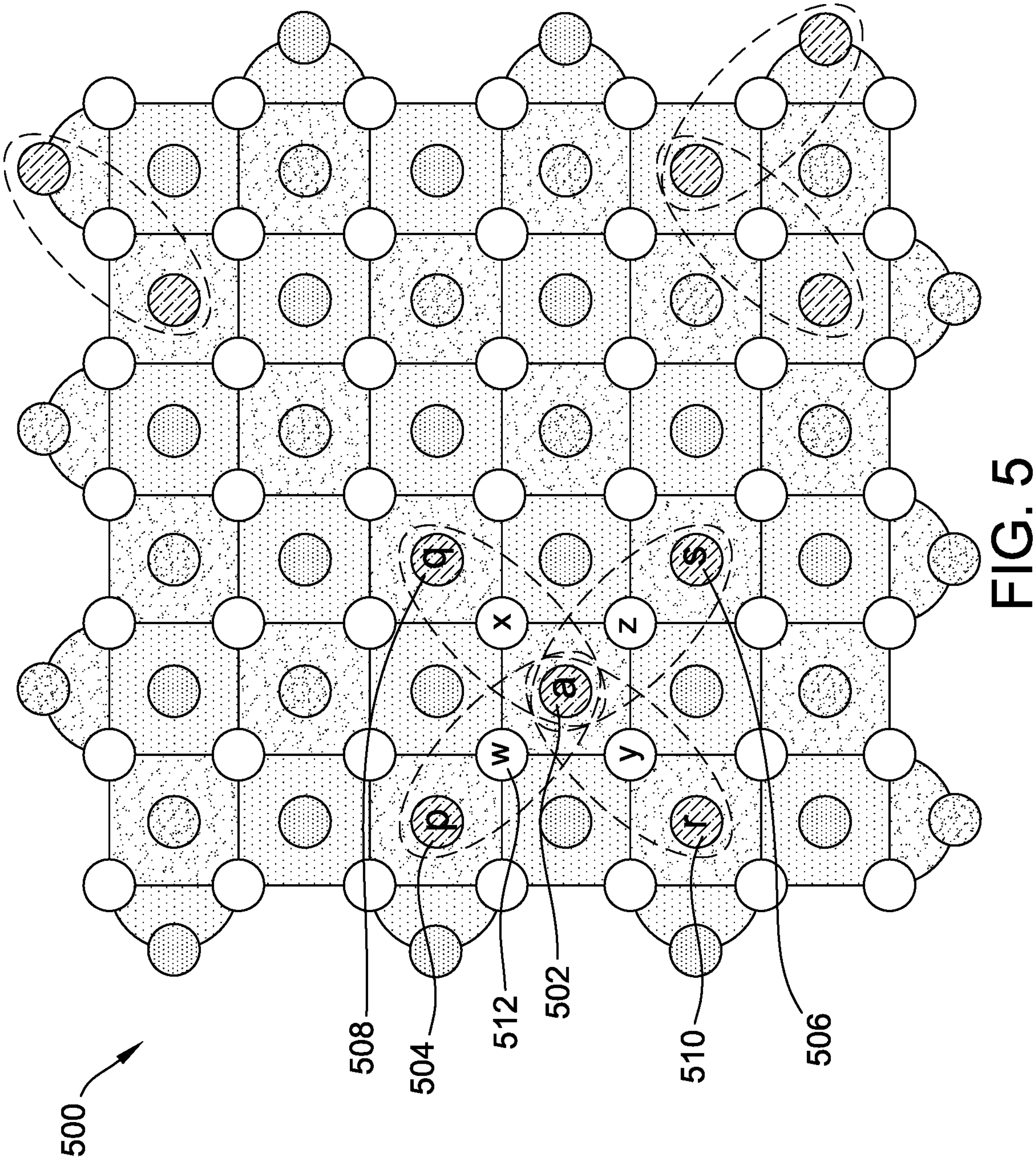

FIG. 5 illustrates a physical mapping of a logical qubit 500 of a code distance d=7 according to an exemplary embodiment. The logical qubit 500 includes a physical data qubit 512 and ancilla qubits 502, 504, 506, 508, and 510. Other physical data qubits and ancilla qubits of the logical qubit 500 are not numbered in FIG. 5. For each ancilla qubit of ancilla qubits 502, 504, 506, 508, and 510 that detects an error, the on-chip clique decoder 412 may check parity of errors on the surrounding neighbor ancilla bits of the same type.

By way of a non-limiting example, if the parity of the neighboring set is even for any clique, such that none of them is set or both of them are set, the on-chip clique decoder 412 may consider this to be a complex error for decoding and may cause the error signature to be delegated to the off-chip decoder 414. Similarly, if the parity of the neighboring set is odd for any clique, such that one of them is set or three of them are set, the on-chip clique decoder 412 may consider this to be a trivial error for decoding. This algorithm or logic for determining whether the error for a clique is trivial or complex, may be further described using the following pseudocode.

```
if (a == TRUE && !parity (p, q, r, s)) <any a> : COMPLEX_DECODE
else: #CLIQUE_DECODE
if (a && p == TRUE): correct w
if (a && q == TRUE): correct x
if (a && r == TRUE): correct y
if (a && s == TRUE): correct z
```

In the above pseudocode, a, p, q, r, and s correspond with ancilla qubits 502, 504, 508, 510, and 506, respectively, and w corresponds with a physical data qubit 512. In the above pseudocode, x, y, z are physical data qubits surrounded by ancilla qubits 502 and 508, 502 and 510, and 502 and 506, respectively. Thus, the pseudocode above describes which physical data qubit to be corrected as well as whether the error is trivial or complex to be decoded by the on-chip clique decoder 412 or the off-chip decoder 414. While decoding and corrections for the trivial errors may be applied by the on-chip clique decoder, complex errors may be decoded via state-of-the-art decoding techniques such as those incorporating Maximum Likelihood, Minimum-Weight-Perfect-Matching, and/or Union Find decoding algorithms. The state-of-the-art decoding techniques for decoding complex errors may be executed, for example, on general purpose classical computing device(s) and/or on dedicated hardware (e.g., application specific integrated circuit (ASIC), a field programmable gate array (FPGA), a system on chip (SOC), and so on).

Figure 6:
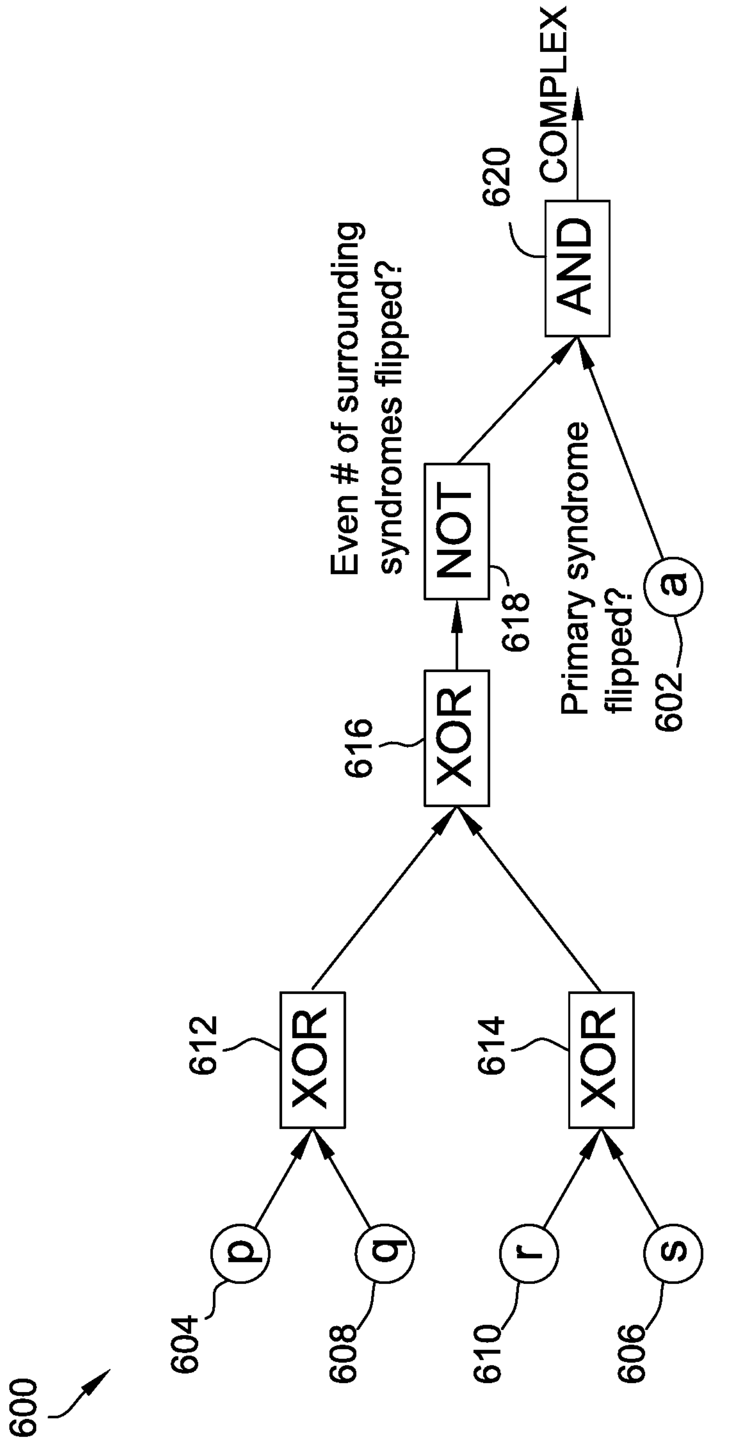

The above pseudocode for determining whether the error is a trivial error or a complex error may be implemented using an exemplary circuit 600 shown in FIG. 6. As shown in the exemplary circuit 600, the above pseudocode or an algorithm to determine whether the error is trivial or complex may be implemented on the on-chip clique decoder using a minimal number of logic gates such as exclusive OR (XOR) gates 612, 614, and 616, an inverter gate 618, and an AND gate 620. Syndromes of parity ancilla qubits a 502, p 504, q 508, r 510, and s 506 may be provided as inputs to the logic gates as shown in FIG. 6 as 602, 604, 608, 610, and 606, respectively, for each clique. A TRUE value of an output of the AND gate 620 may indicate the error is a complex error, and a FALSE value of an output of the AND gate 620 may indicate the error is a trivial error. In some embodiments, and by way of a non-limiting example, Toffoli gates may be used to implement the on-chip clique decoder in addition to, or alternate to, the logic gates of classical computing device.

Additionally, or alternatively, measurement errors may occur while measuring parity ancilla qubits, and a parity qubit may randomly flip during one or more measurement cycles. Measurements errors on the parity ancilla qubits may be detected by performing multiple measurements over many measurement rounds. Errors that are found across the many measurement rounds (e.g., error that stick across the many measurement rounds) may be considered as data errors, and errors that disappear or happen across one or more measurement rounds only may be considered as measurement errors. However, measurement errors that persists further may be considered as complex errors, in some examples.

As described herein, in some embodiments, the on-chip clique decoder 412 may aggregate or combine syndrome data from adjacent rounds of measurement for neutralizing a high percentage of measurement errors. By way of a non-limiting example, two or more measurement rounds may be aggregated to determine measurement errors. However, aggregating more than two measurement rounds may need additional hardware (e.g., XOR gates).

Returning back to FIG. 4 to discuss functions of the bandwidth allocation and/or stall insertion module 418, it has been observed during experiments that about 95% of syndromes or error signatures are trivial per logical qubit per clique and about 5% of syndromes or error signatures are complex and may be required to be transferred to an off-chip decoder 414. For a quantum computing device of about 1000 logical qubits, about 50 off-chip decodes may be required for each cycle. However, provisioning bandwidth for about 50 off-chip decodes may frequently require stalling the execution of the quantum application. Stalling the execution of the quantum application may be significantly reduced by allocating bandwidth such that a high fraction of the off-chip decodes may be decoded during each cycle. However, when required, execution of the quantum application circuit may be stalled by sending a control signal to a waveform generator. The waveform generator generally generates gate pulses to perform operations on various qubits. However, during a stall cycle, no operation is performed on any qubit. In some examples, the stall cycle may be indicated by, or corresponds, with the Identity gates over all the qubits.

The on-chip clique decoder 412, as described herein, in some embodiments, may be implemented in superconducting hardware referenced herein as SFQ logic. The SFQ logic may be implemented using Josephson junctions. The Josephson junctions include superconducting devices exhibiting Josephson effect (that is indefinitely long current without applying any voltage and having propagation delay in pico-seconds. Additionally, or alternatively, the SFQ logic may be energy efficient rapid SFQ logic and may be according to an exemplary ERSFQ cell library, as shown in a table below.

| GATE | Delay | Area (μm$^2$) | Josephson Junctions Count (ps) |
|---|---|---|---|
| XOR2 | 6.2 | 7000 | 18 |
| AND2 | 8.2 | 7000 | 16 |
| OR2 | 5.4 | 7000 | 14 |
| NOT | 12.8 | 7000 | 12 |
| DFF | 8.6 | 5600 | 10 |
| SPLIT | 7.0 | 3500 | 4 |

In some embodiments, the clique decoder may be designed as, and/or configured as, an off-chip first level decoder to handle trivial common case decodes. In some examples, a clique decoder as an off-chip first level decoder may reduce decoding latency and/or improve energy efficiency. Additionally, or alternatively, the complex decoder (or a decoder to decode complex error signatures) may be operated under relaxed power and/or thermal constraints to reduce decoding latency.

In some embodiments, on-chip clique decoder and/or off-chip decoder may be implemented in a hierarchy of decoders with specialization. Additionally, or alternatively, one or more most likely error signatures may be stored or cached in a lookup table along with decoded corrections corresponding to the respective error signature. By way of a non-limiting example, the one or more most likely error signatures may be identified through static and/or dynamic profiling. While quantum error correction codes referenced in the present disclosure are surface codes, other types of quantum error correction codes, such as error correction codes (having good locality) from the low-density parity check (LDPC) family may also be used. Additionally, or alternatively, Color codes may be used, in particular, for trapped-ion quantum technologies.

Figure 7:
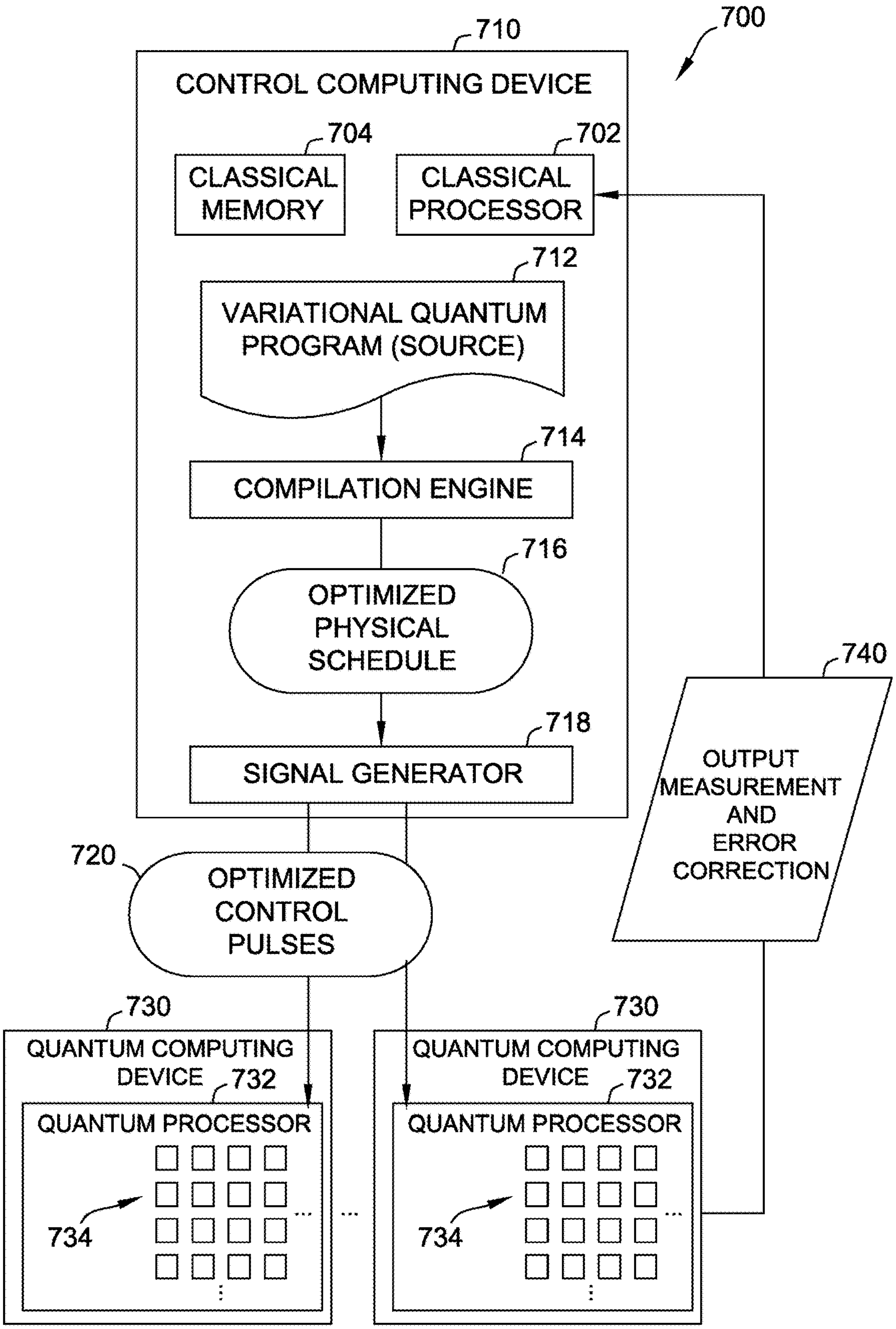

FIG. 7 is a diagram of exemplary ensemble of quantum computing devices 700 for executing a quantum application on a quantum computing device 730*s*. The ensemble of quantum computing devices 700 may include a control computing device 710 that is configured to prepare (e.g., compile and optimize) a quantum program 712 for execution on the quantum computing devices 730*s*. In particular, different quantum application operations of the quantum application may be executed in parallel using the quantum computing devices 730*s*. More than one quantum computing device of the plurality of quantum computing devices 730*s* may perform a particular or a respective quantum application operation of the quantum application operations in parallel.

The control computing device 710 may include a classical processor 702 (e.g., a central processing unit ("CPU"), an x86-based processor, or the like) that can be configured to execute classical processor instructions, a classical memory 704 (e.g., random access memory ("RAM"), memory SIMM, DIMM, or the like, that includes classical bits of memory). A quantum computing device 730 of the quantum computing devices 730*s* may include multiple qubits 734 that represent a quantum processor 732 upon which the quantum application program 712 is executed.

In some examples, the quantum application program 712 may be a variational quantum application program that interleaves compilation with computation during runtime, and the quantum processor 732 may include 50 or 100 qubits, but it should be understood that the present disclosure is envisioned to be operable and beneficial for quantum processors with any number of qubits, for example, many tens, hundreds, or more qubits 734.

The fundamental unit of quantum computation is a quantum bit (or a qubit) 734. In contrast to classical bits ("cbits"), qubits are capable of existing in a superposition of logical states, notated herein as $|0\rangle$ and $|1\rangle$. The general quantum state of a qubit may be represented as:

$$|\psi 1\rangle = \alpha|0\rangle + \beta|1\rangle,$$

where α, β are complex coefficients with $|\alpha|^2+|\beta|^2=1$. When measured in the 0/1 basis, the quantum state collapses to $|0\rangle$ or $|1\rangle$ with a probability of $|\alpha|^2$ and $|\beta|^2$, respectively. The qubit 734 can be visualized as a point on a 3D sphere called the Bloch sphere. Qubits 734 can be realized on different Quantum Information Processing (QIP) platforms, including ion traps, quantum dot systems, and, in the example embodiment, superconducting circuits. The number of quantum logical states grows exponentially with the number of qubits 734 in the quantum processor 732. For example, a system with three qubits 734 can live in the superposition of eight logical states: $|000\rangle$, $|001\rangle$, $|010\rangle$, $|011\rangle$, . . . $|111\rangle$. This property sets the foundation of potential quantum speedup over classical computation. In other words, an exponential number of correlated logical states can be stored and processed simultaneously by the quantum system 700 with a linear number of qubits 734.

A quantum algorithm may be described in terms of a quantum circuit. During quantum compilation, the quantum application program 712 may be first decomposed into a set of 1- and 2-qubit discrete quantum operations called logical quantum gates. These quantum gates are represented in matrix form as unitary matrices. 1-qubit gates correspond to rotations along a particular axis on the Bloch sphere. In an example quantum instruction set architecture ("ISA"), the 1-qubit gate set may include rotations along the x-, y-, and z-axes of the Block sphere. Such gates are notated herein as $R_x$, $R_y$, and $R_z$ gates, respectively. Further, the quantum ISA may also include a Hadamard gate, which corresponds to a rotation about the diagonal x+z axis. An example of a 2-qubit logical gate in the quantum ISA is a Controlled-NOT ("CNOT" or "CX") gate, which flips the state of the target qubit if the control qubit is $|1\rangle$ or leaves the state unchanged if the control qubit is $|0\rangle$. For example, the CX gate sends $|10\rangle$ to $|11\rangle$, sends $|11\rangle$ to $|10\rangle$, and preserves the other logical states.

Further, it should be understood that the general logical assembly instructions typically used during compilation of the variational quantum application program 712 were designed without direct consideration for the variations in the types of physical hardware that may be used. As such, there is often a mismatch between the logical instructions and the capabilities of the particular QIP platform. For example, on some QIP platforms, it may not be obvious how to implement the CX gate directly on that particular physical platform. As such, a CX gate may be further decomposed into physical gates in a standard gate-based compilation. Other example physical quantum gates for various architectures include, for example, in platforms with Heisenberg interaction Hamiltonian, such as quantum dots, the directly implementable 2-qubit physical gate is the $\sqrt{\text{SWAP}}$ gate, which implements a SWAP when applied twice. In platforms with ZZ interaction Hamiltonian, such as superconducting systems of Josephson flux qubits and NMR quantum systems, the physical gate is the CPhase gate, which is identical to the CX gate up to single qubit rotations. In platforms with XY interaction Hamiltonian, such as capacitively coupled Josephson charge qubits (e.g., transmon qubits), the 2-qubit physical gate is iSWAP gate. For trapped ion platforms with dipole-chain interaction, two popular physical 2-qubit gates are the geometric phase gate and the XX gate.

The quantum processor 732 can be continuously driven by external physical operations to any state in the space spanned by the logical states. The physical operations, called control fields, are specific to the underlying system, with control fields and system characteristics controlling a unique and time-dependent quantity called the Hamiltonian. The Hamiltonian determines the evolution path of the quantum states. For example, in superconducting systems such as the example quantum computing device 730, the qubits 734 can be driven to rotate continuously on the Bloch sphere by applying microwave electrical signals. By varying the intensity of the microwave signal, the speed of rotation of the qubit 734 can be manipulated. The ability to engineer the system Hamiltonian in real time allows the quantum computing system 700 to direct the qubits 734 to the quantum state of interest through precise control of related control fields. Thus, quantum computing may be achieved by constructing a quantum system in which the Hamiltonian evolves in a way that aligns with high probability upon final measurement of the qubits 734. In the context of quantum control, quantum gates can be regarded as a set of preprogrammed control fields performed on the quantum processor 732.

During operation, the control computing device 710 implements a quantum algorithm, attempting to create as efficient a quantum circuit as possible, where efficiency may be in terms of circuit width (e.g., number of qubits) and depth (e.g., length of critical path, or runtime of the circuit). In some embodiments, the compilation engine 714 optimizes various circuits or subcircuits using IBM Qiskit transpiler, which applies a variety of circuit identities (e.g., aggressive cancellation of CX gates and Hadamard gates). In some embodiments, the compilation engine 114 also performs additional merging of rotation gates (e.g., $R_x(\alpha)$ followed by $R_x(\beta)$ merges into $R_x(\alpha+\beta)$) to further reduce circuit sizes.

At the lowest level of hardware, quantum computers are controlled by analog pulses. Therefore, quantum compilation translates from a high-level quantum algorithm down to a sequence of control pulses 720. Once a quantum algorithm has been decomposed into a quantum circuit comprising single- and two-qubit gates, gate-based compilation can be performed by concatenating a sequence of pulses corresponding to each gate. In particular, a lookup table maps from each gate in the gate set to a sequence of control pulses that executes that gate. Pure gate-based compilation provides an advantage in short pulse compilation time, as the lookup and concatenation of pulses can be accomplished very quickly. Some known methods of compilation for variational algorithms use the gate-based approach to compilation, using parameterized gates such as $R_x(\theta)$ and $R_z(\phi)$. However, the pure gate-based compilation approach prevents the optimization of pulses from happening across the gates because there might exist a global pulse for an entire circuit that is shorter and more accurate than the concatenated one. The quality of the concatenated pulse relies heavily on an efficient gate decomposition of the quantum algorithm. GRAPE is a strategy for compilation that numerically finds the best control pulses needed to execute a quantum circuit or sub-circuit by following a gradient descent procedure. In contrast to the gate-based approach. GRAPE does not have the limitation incurred by the gate decomposition. Instead, the GRAPE-based approach directly searches for the optimal control pulse for the input circuit as a whole. Some embodiments described herein utilize GRAPE for portions of compilation, as described in further detail below.

In the example embodiment, the control computing device 710 includes a compilation engine 714 that, during operation, is configured to compile the variational quantum application program 712 (e.g., from source code) into an optimized physical schedule 716. The quantum computing device 730 is a superconducting device and the signal generator 718 is an arbitrary wave generator ("AWG") configured to perform the optimized control pulses 720 on the quantum processor 732 (e.g., via microwave pulses sent to the qubits 734, where the axis of rotation is determined by the quadrature amplitude modulation of the signal and where the angle of rotation is determined by the pulse length of the signal). The optimized physical schedule 716 represents a set of control instructions and associated schedule that, when sent to the quantum computing device 730 as optimized control pulses 720 (e.g., the pre-programmed control fields) by a signal generator 718, cause the quantum computing device 730 to execute the quantum program 712.

In the example embodiment, the optimized physical schedule 716 may represent a set of control instruction and associated schedule corresponding to each quantum computing device 730 of the ensemble of quantum computing device to perform a respective quantum application operation of the quantum application operations. An output from the ensemble of quantum devices may be measured and/or error detection, decoding, and correction may be applied by an output measurement and error correction module 740. Even though the output measurement and error correction module 740 is shown separate from an ensemble of quantum computing device, the output measurement and error correction module 740 may be partly (e.g., on-chip clique decoder) implemented on the ensemble of quantum computing device 730s and partly (e.g., off-chip decoder) implemented on the control computing device 710. It should be understood that other quantum computing architectures may have different supporting hardware.

In some example embodiments, the variational quantum program 712 may be a Variational Quantum Eigensolver (VQE). The quantum computing system 700 may use VQE to find the ground state energy of a molecule. This task is exponentially difficult in general for a classical computer, but efficiently solvable by a quantum computer. Estimating the molecular ground state has important applications to chemistry such as determining reaction rates and molecular geometry. A conventional quantum algorithm for solving this problem is the Quantum Phase Estimation (QPE) algorithm. However, for target precision $\varepsilon$, QPE yields a quantum circuit with depth $O(1/\varepsilon)$, whereas VQE algorithm yields $O(1/\varepsilon^2)$ iterations of depth $O(1)$ circuits. The latter assumes a more relaxed fidelity requirement on the qubits and gate operations, because the higher the circuit depth, the more likely the circuit experiences an error at the end, and possibly wrong output string may be generated from execution of the quantum application program.

Even if quantum computing devices are manufactured in a highly controlled setting, unavoidable variation may result in each quantum computing device to have different intrinsic properties. Due to each quantum computing device having different intrinsic properties, each quantum computing device's performance is impacted differently even if each quantum computing device is subjected to the same input conditions in a controlled environment. This variation (in intrinsic properties) between and within quantum computing devices becomes apparent while examining error rates.

As will be appreciated based on the foregoing specification, the above-described embodiments of the disclosure may be implemented using computer programming or engineering techniques including computer software, firmware, hardware or any combination or subset thereof, wherein the technical effect is to compile and optimize a variational quantum program for execution on a quantum processor. Any such resulting program, having computer-readable code means, may be embodied, or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These conventional computer programs (also known as programs, software, software applications, "apps," or code) include machine instructions for a conventional programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

Figure 8:
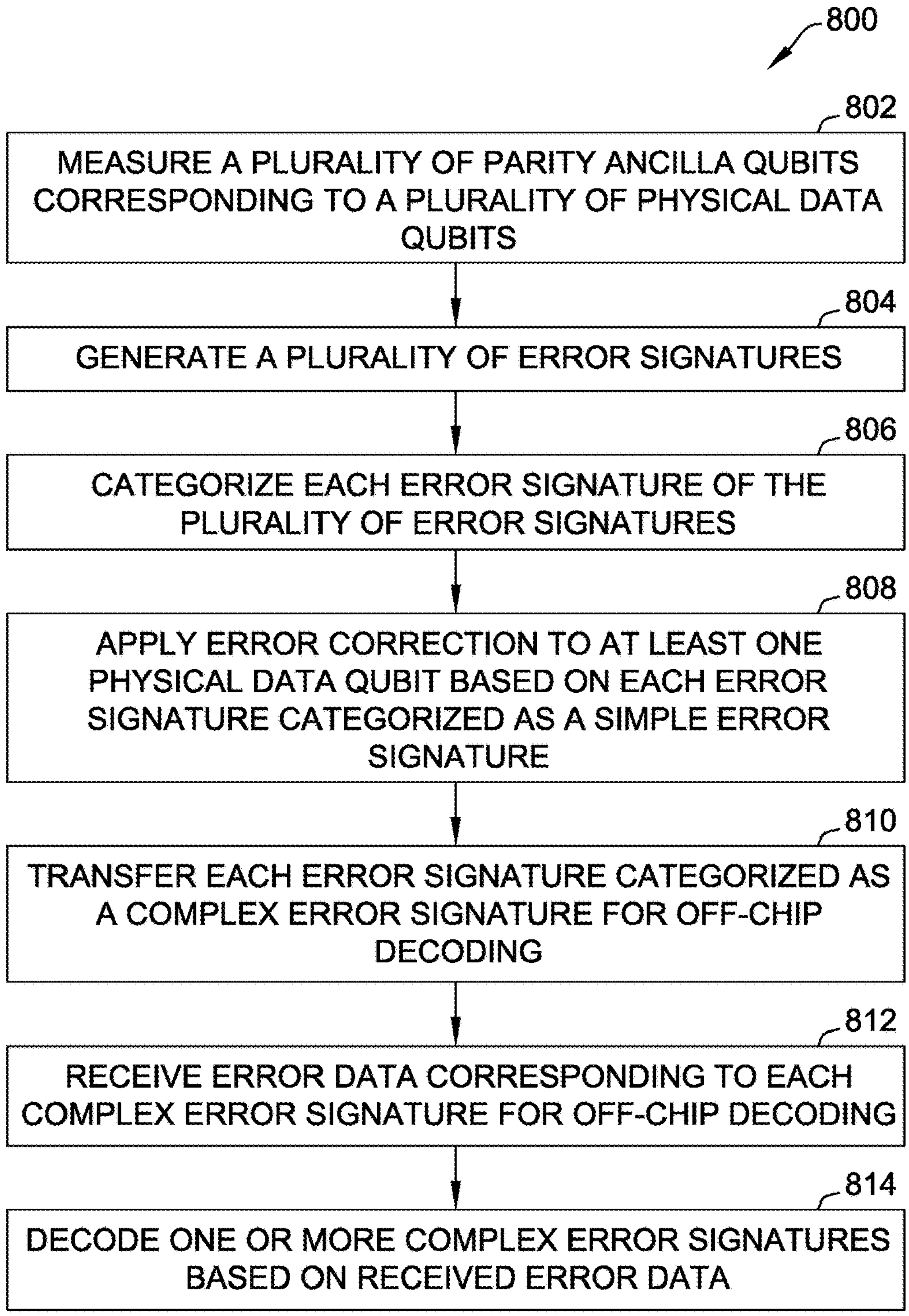

FIG. 8 illustrates an exemplary flow-chart 800 of method operations to decode error signatures according to an exemplary embodiment of the present disclosure. In some embodiments, the method operations may correspond with decoding for quantum error correction during execution of a quantum application circuit on a quantum computing resource. The quantum computing resource may include a plurality of logical qubits. Each logical qubit of the plurality of qubits may include a plurality of physical data qubits and a plurality of parity ancilla qubits. The method may be implemented using at least one classical processor (e.g., the classical processor 702) of a classical computing resource (e.g., the control computing device 710) in communication with a classical memory (e.g., the classical memory 704) of the classical computing resource. The method operations in the flow-chart 800 are performed during each execution cycle of the quantum application circuit.

During each execution cycle of the quantum application circuit, the at least one classical processor 702 of the classical computing resource 710 may cause at least one classical processor (not shown in drawings) included in a decoder controller (e.g., on-chip decoder controller 412, and/or the output measurement and error correction module 740) to measure (802) the plurality of parity ancilla qubits corresponding to the plurality of physical data qubits. As described herein, the plurality of parity ancilla qubits may be measured for one or more measurement rounds. Measurements of the plurality of parity ancilla qubits may be combined to neutralize measurement errors, as described herein. In accordance with the measured plurality of parity ancilla qubits, a plurality of error signatures corresponding to the plurality physical data qubits may be generated (804). The generated plurality of error signatures may be categorized (806) to identify or determine whether each error signature of the generated plurality of error signature is one of a simple (or trivial) error signature and/or a complex error signature. As described herein, for the simple (or trivial) error signature, an appropriate error correction may be applied (808) to one or more (or at least one) physical data qubit of the plurality of physical data qubits.

However, if an error signature is categorized (806) as a complex error signature, the complex error signature (and corresponding error data) may be transferred (810) for decoding by the at least one classical processor 702 of the classical computing resource 710 (or an off-chip decoder such as 414). Error data associated with one or more complex error signatures may be received (812) from the decoder controller, and the one or more complex error signatures may be decoded (814) in accordance with the received error data.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A quantum computing system providing quantum processing as a service, the quantum computing system comprising:

a quantum computing resource including a plurality of logical qubits, each logical qubit including a plurality of physical data qubits and a plurality of parity ancilla qubits;

a classical memory storing a quantum circuit of a quantum application and instructions for execution of the quantum circuit;

an on-chip decoder controller communicatively coupled with the quantum computing resource and comprising at least one classical processor that is configured to:

measure the plurality of parity ancilla qubits corresponding to the plurality of physical data qubits during a respective cycle;

in accordance with the measured plurality of parity ancilla qubits, generate a plurality of error signatures corresponding to the plurality physical data qubits during the respective cycle;

categorize each error signature of the plurality of error signatures as one of a simple error signature and a complex error signature;

apply error correction to at least one physical data qubit of the plurality of physical data qubits corresponding to each error signature categorized as the simple error signature; and transfer each error signature categorized as the complex error signature for off-chip decoding during the respective cycle; and at least one classical processor executing the stored instructions for execution of the quantum circuit that cause the at least one classical processor to:

receive, from the on-chip decoder controller, error data associated with one or more complex error signatures of the plurality of error signatures; and in accordance with the received error data, decode the one or more complex error signatures of the plurality of error signatures for error correction.

2. The quantum computing system of claim 1, wherein the on-chip decoder controller is cooled to an operating temperature that is below a particular temperature threshold.

3. The quantum computing system of claim 1, wherein the off-chip decoding is performed by the at least one classical processor at an operating temperature that is above a specific temperature threshold.

4. The quantum computing system of claim 1, wherein to categorize each error signature of the plurality of error signatures as one of the simple error signature and the complex error signature, the on-chip decoder controller further includes a plurality of logic gates including one or more of: an exclusive OR gate, an inverter gate, and an AND gate.

5. The quantum computing system of claim 1, wherein to categorize each error signature of the plurality of error signatures as one of the simple error signature and the complex error signature, the on-chip decoder controller further includes one or more Toffoli gates.

6. The quantum computing system of claim 1, wherein the at least one classical processor of the on-chip decoder controller is further configured to:

neutralize measurement errors by combining error signatures generated for two or more measurement rounds for the plurality of parity ancilla qubits.

7. The quantum computing system of claim 1, wherein the at least one classical processor executing the stored instructions further cause the at least one classical processor to:

determine whether a bandwidth required for transferring the error data associated with the one or more complex error signatures of the plurality of error signatures exceeds a bandwidth allocated for transferring the error data associated with the one or more complex error signatures; and in accordance with determining that the bandwidth required for transferring the error data exceeds the bandwidth allocated for the transferring the error data, stall the execution of the quantum circuit for at least one cycle.

8. The quantum computing system of claim 1, wherein the plurality of parity ancilla qubits of each logical qubits including surface codes of a particular code distance.

9. A method of decoding for quantum error correction during execution of a quantum application circuit on a quantum computing resource including a plurality of logical qubits, each logical qubit of the plurality of qubits comprising a plurality of physical data qubits and a plurality of parity ancilla qubits, the method is implemented using at least one classical processor of a classical computing resource in communication with a classical memory of the classical computing resource, the method comprising:

during a respective cycle of the execution of the quantum application circuit, causing at least one classical processor included in a decoder controller communicatively coupled with the quantum computing resource to, measure the plurality of parity ancilla qubits corresponding to the plurality of physical data qubits;

in accordance with the measured plurality of parity ancilla qubits, generate a plurality of error signatures corresponding to the plurality physical data qubits;

categorize each error signature of the plurality of error signatures as one of a simple error signature and a complex error signature;

apply error correction to at least one physical data qubit of the plurality of physical data qubits corresponding to each error signature categorized as the simple error signature; and transfer each error signature categorized as the complex error signature for decoding by the at least one classical processor of the classical computing resource;

receiving, from the decoder controller, error data associated with one or more complex error signatures of the plurality of error signatures; and in accordance with the received error data, decoding the one or more complex error signatures of the plurality of error signatures for error correction.

10. The method of claim 9, wherein the decoder controller is cooled to an operating temperature that is below a particular temperature threshold.

11. The method of claim 9, wherein the decoding by the at least one classical processor of the classical computing resource is performed at an operating temperature that is above a specific temperature threshold.

12. The method of claim 9, wherein to categorize each error signature of the plurality of error signatures as one of the simple error signature and the complex error signature, the decoder controller further includes a plurality of logic gates including one or more of: an exclusive OR gate, an inverter gate, and an AND gate.

13. The method of claim 9, wherein to categorize each error signature of the plurality of error signatures as one of the simple error signature and the complex error signature, the decoder controller further includes one or more Toffoli gates.

14. The method of claim 9, further comprising:

during the respective cycle of the execution of the quantum application circuit, causing the at least one classical processor included in the decoder controller communicatively coupled with the quantum computing resource to neutralize measurement errors by combining error signatures generated for two or more measurement rounds for the plurality of parity ancilla qubits.

15. The method of claim 9, further comprising:

determining whether a bandwidth required for transferring the error data associated with the one or more complex error signatures of the plurality of error signatures exceeds a bandwidth allocated for transferring the error data associated with the one or more complex error signatures; and in accordance with determining that the bandwidth required for transferring the error data exceeds the bandwidth allocated for the transferring the error data, stalling the execution of the quantum circuit for at least one cycle.

16. The method of claim 9, wherein the plurality of parity ancilla qubits of each logical qubits including surface codes of a particular code distance.

17. A quantum computing system, comprising:

a quantum computing resource including a plurality of logical qubits, each logical qubit including a plurality of physical data qubits and a plurality of parity ancilla qubits;

a primary decoder controller communicatively coupled with the quantum computing resource and comprising at least one classical processor that is configured to:

measure the plurality of parity ancilla qubits corresponding to the plurality of physical data qubits during a respective execution cycle;

in accordance with the measured plurality of parity ancilla qubits, generate a plurality of error signatures corresponding to the plurality physical data qubits during the respective execution cycle;

categorize each error signature of the plurality of error signatures as one of a simple error signature and a complex error signature;

apply error correction to at least one physical data qubit of the plurality of physical data qubits corresponding to each error signature categorized as the simple error signature; and transfer each error signature categorized as the complex error signature for decoding by a secondary decoder controller during the respective cycle; and the secondary decoder controller comprising at least one classical processor that is configured to:

receive, from the primary decoder controller, error data associated with one or more complex error signatures of the plurality of error signatures; and in accordance with the received error data, decode the one or more complex error signatures of the plurality of error signatures for error correction.

18. The quantum computing system of claim 17, wherein the primary decoder controller is cooled to an operating temperature that is below a particular temperature threshold.

19. The quantum computing system of claim 17, wherein the secondary decoder controller is decoding the one or more complex error at an operating temperature that is above a specific temperature threshold.

20. The quantum computing system of claim 17, wherein to categorize each error signature of the plurality of error signatures as one of the simple error signature and the complex error signature, the primary decoder controller further includes a plurality of logic gates including one or more of: an exclusive OR gate, an inverter gate, an AND gate, and a Toffoli gate.

* * * * *